United States Patent [19]

Yoshino

[11] Patent Number: 5,541,962
[45] Date of Patent: Jul. 30, 1996

[54] TRANSMISSION TIMING ADJUSTING DEVICE

[75] Inventor: Toyohiko Yoshino, Kawasaki, Japan

[73] Assignee: Fujitsu Limited, Japan

[21] Appl. No.: 305,035

[22] Filed: Sep. 13, 1994

[30] Foreign Application Priority Data

Mar. 10, 1994 [JP] Japan .................... 6-039375

[51] Int. Cl.⁶ .................... H04K 1/10; H04L 27/28; H04L 7/00
[52] U.S. Cl. .................... 375/354; 370/24; 375/357
[58] Field of Search .................... 375/260, 354, 375/357, 356; 371/8.1, 8.2, 9.1; 370/100.1, 24, 32, 58.1, 53, 58.3

[56] References Cited

U.S. PATENT DOCUMENTS

| | | | |
|---|---|---|---|
| 4,276,637 | 6/1981 | Le Dieu | 370/58 |
| 4,730,303 | 3/1988 | Suzuki | 370/58 |
| 5,229,293 | 3/1994 | Mestdagh et al. | 371/8.1 X |
| 5,406,548 | 4/1995 | Itoh et al. | 371/8.1 X |

FOREIGN PATENT DOCUMENTS

56-21436 2/1981 Japan.

Primary Examiner—Stephen Chin
Assistant Examiner—Bryan Webster
Attorney, Agent, or Firm—Greer, Burns & Crain, Ltd.

[57] ABSTRACT

A transmission timing adjusting device is provided for a transmitting/receiving apparatus equipped with active and standby transmitting/receiving circuits for carrying out two-way communications via an identical communication path, wherein a switching from the active system to the standby system can be carried out without interrupting communications. The active transmitting/receiving circuit transmits a first transmission signal to a remote station, which in turn transmits a second transmission signal to the active and standby transmitting/receiving circuits. Active-side time detecting circuit detects a first time period from a first timing at which the first transmission signal is transmitted therefrom to a second timing at which the second transmission signal is received thereby. Standby-side time detecting circuit detects a second time period from the first timing to a third timing at which the second transmission signal is received thereby. Difference calculating circuit calculates the difference between the first and second time periods, and based on the calculated difference, transmission timing adjusting circuit adjusts the transmission timing of the standby transmitting/receiving circuit in advance.

16 Claims, 9 Drawing Sheets

FIG. 4 (A) FRAME PATTERN

FIG. 4 (B) INPUT DATA

TRANSMISSION TIMING ADJUSTING DEVICE

BACKGROUND OF THE INVENTION (1) Field of the Invention

The present invention relates to a transmission timing adjusting device for a transmitting/receiving apparatus equipped with two transmitting/receiving means, one for actual use and the other for standby reserve, for carrying out two-way communications via an identical communication path, and more particularly, to a transmission timing adjusting device for a transmitting/receiving apparatus which constitutes an optical coupler-connected 2:n redundant system in a PON (passive optical network) and which carries out optical communications between a station equipment and each of subscriber equipments through a single optical fiber according to TCM (time compression multiplex) procedure.

(2) Description of the Related Art

In conventional transmitting apparatuses using TCM-TDMA (time division multiple access) procedure, signals transmitted from a plurality of subscriber equipment through respective optical fibers are multiplexed by a star coupler before they are sent to a station equipment. When the signals are multiplexed, array control is performed such that burst signals from the respective subscriber equipments do not superpose one upon another. This array control, however, cannot be proper if the burst signals are arrayed simply according to their burst lengths. Namely, since the lengths of optical fibers connecting the respective subscriber equipments to the star coupler usually differ from one another, the burst signals are subject to different transmission delays, depending upon the fiber lengths. Accordingly, the burst signals cannot be multiplexed at respective predetermined positions and may possibly be superpose one upon another.

To avoid this, the delay time of the burst signal from each subscriber equipment is measured beforehand at the station equipment, and the transmission timings at which the burst signals are transmitted from the respective subscriber equipments are adjusted based on the difference of the measured values, thereby correcting the multiplexing positions of the burst signals.

However, this correction method is effective only in the case where the station equipment involves no redundancy. Where the station equipment has redundancy and at the same time the length of an optical fiber connecting the star coupler to an active system which is currently in use differs from that of an optical fiber connecting the star coupler to a standby system which is for standby reserve, a problem arises in that up and down signals superpose one upon the other when the system is switched from the currently active system to the standby system, as described below. A means of solving the problem of superposition of up and down signals associated with a switching from the active system to the standby system is disclosed, for example, in Unexamined Japanese Patent Publication (KOKAI) No. 56-21436, though the apparatus disclosed is not an optical communication apparatus but a satellite communication apparatus. This satellite communication apparatus is a redundant communication apparatus of TDMA type, wherein a radio wave is always transmitted from the standby system to correct the multiplexing positions of burst signals so that system discontinuance may not occur when the system is switched from the active system to the standby system.

Figure 8:
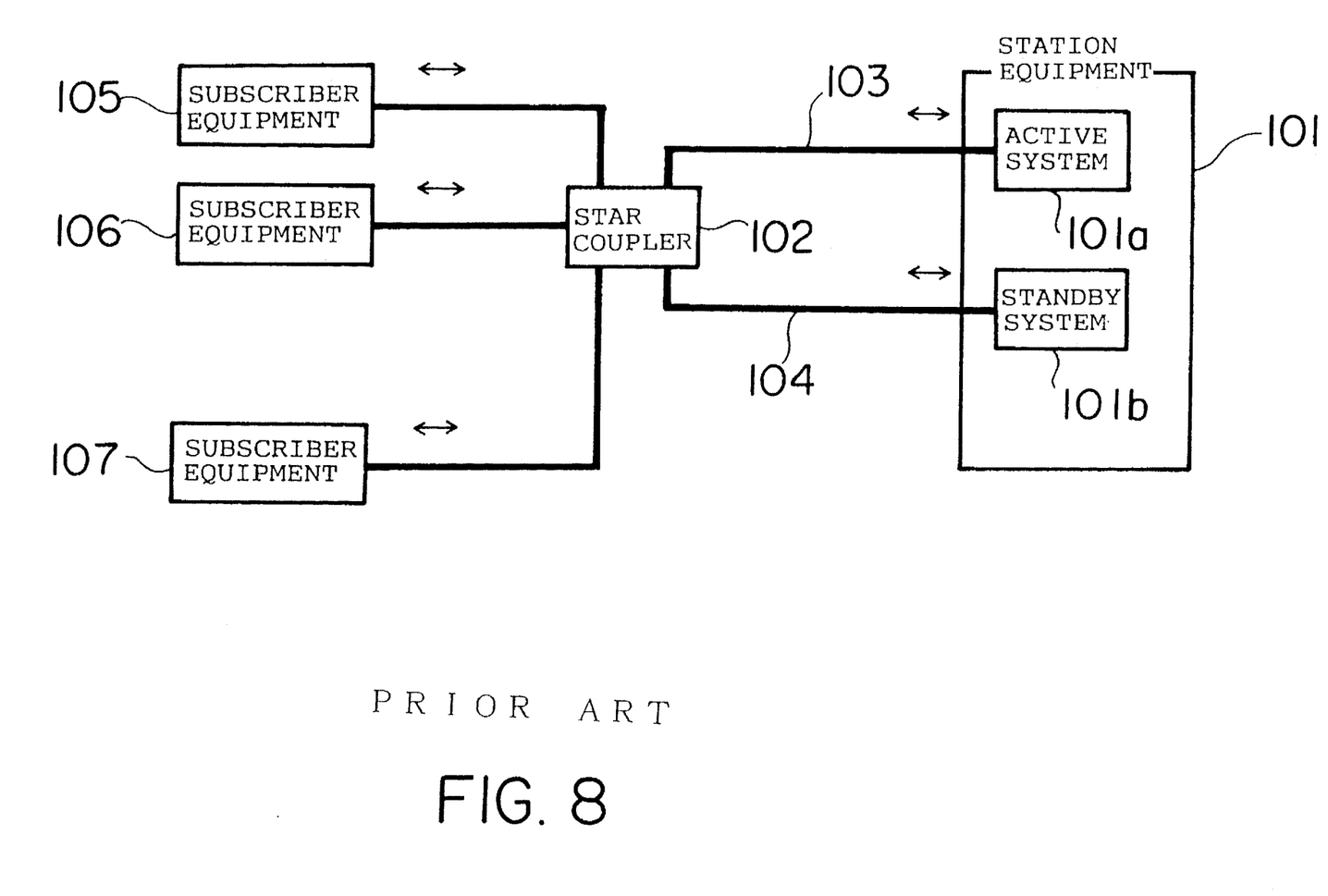
FIG. 8 is a diagram illustrating how subscriber equipments are connected to a redundant station equipment.

As shown in FIG. 8, in the case where a station equipment 101 is provided with a transmitting/receiving circuit 101a for actual use and another transmitting/receiving circuit 101b for standby reserve, the length of an optical fiber 103 connecting a star coupler 102 to the active transmitting/receiving circuit 101a usually differs from that of an optical fiber 104 connecting the star coupler 102 to the standby transmitting/receiving circuit 101b. The star coupler 102 is also connected to a plurality of subscriber equipments 105 to 107, each via an optical fiber, as mentioned above.

When the circuit used is switched from the active transmitting/receiving circuit 101a to the standby transmitting/receiving circuit 101b, it is necessary that the transmission timings for up signals (signals from the subscriber equipments to the station equipment) should be corrected. This will be explained with reference to FIG. 9 which illustrates the timings of signal transmission and reception between the station equipment and the individual subscriber equipments.

Figure 9:
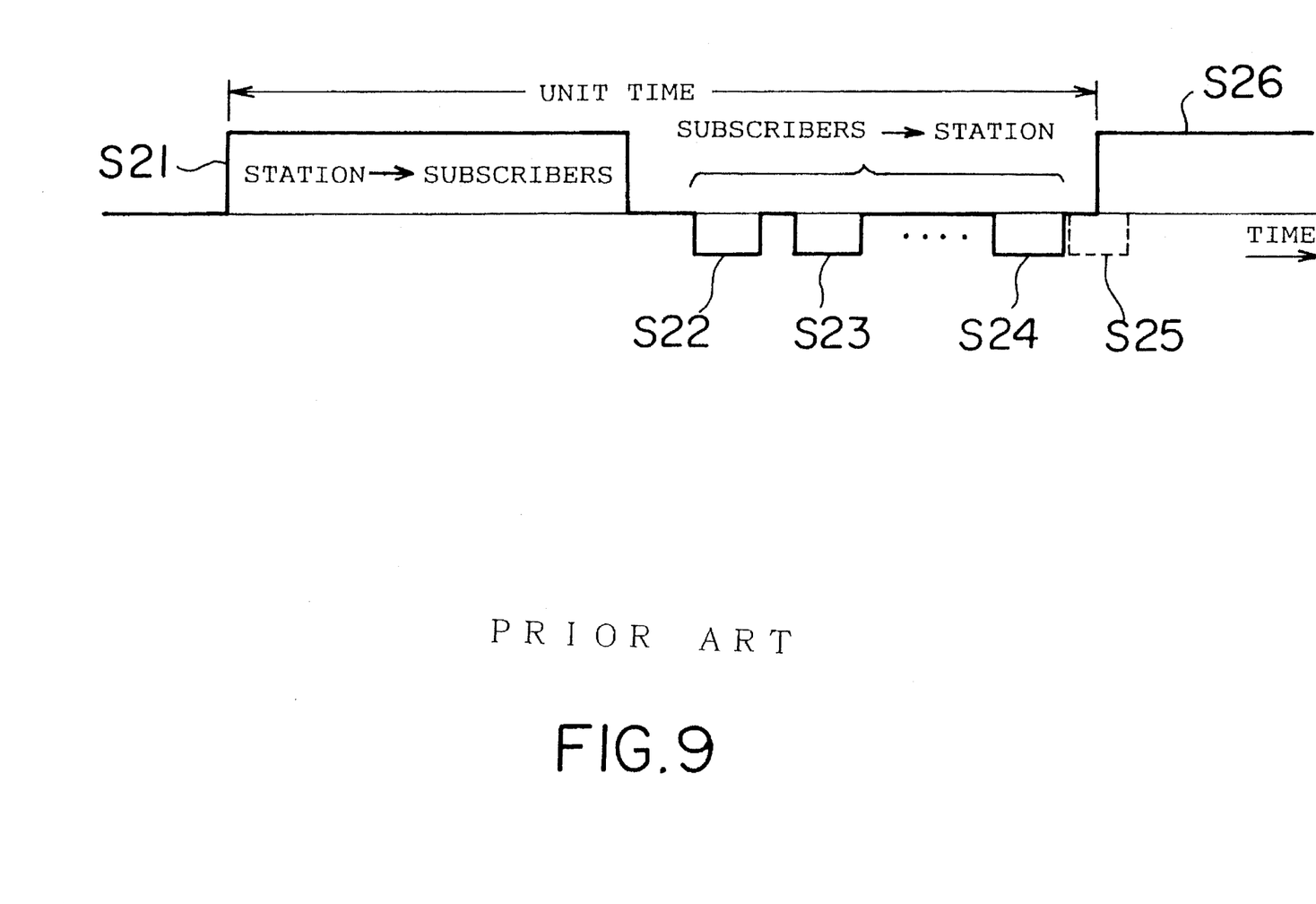
FIG. 9 is a chart showing timings of signal transmission and reception between the station equipment and the subscriber equipments.

As illustrated, down signals S21 and S26 are transmitted from the active transmitting/receiving circuit 101a of the station equipment 101 to each of the subscriber equipments 105 to 107 at intervals of unit time. On the other hand, the subscriber equipments 105 to 107 transmit up signals (burst signals) S22 to S24 to the active transmitting/receiving circuit 101a of the station equipment 101 at respective predetermined timings based on the transmission timing of the down signal S21. These timings are determined in consideration of the transmission delay of a signal from a reference subscriber equipment to the active transmitting/receiving circuit 101a, and are corrected based on the difference in fiber length between the star coupler 102 and the respective subscriber equipments 105 to 107, as mentioned above. Accordingly, the up signals S22 to S24 can be arrayed at predetermined intervals between the down signals S21 and S26.

If, however, the optical fiber 104 connecting the star coupler 102 to the standby transmitting/receiving circuit 101b is, for example, longer than the optical fiber 103 connecting the star coupler 102 to the active transmitting/receiving circuit 101a, when the circuit used is switched from the active circuit 101a to the standby circuit 101b the times at which the up signals S22 to S24 reach the standby circuit 101b are delayed. Consequently, a situation could arise where the standby transmitting/receiving circuit 101b starts transmitting the down signal S26 before the last up signal S24 reaches the standby circuit 101b (indicated at S25 in FIG. 9).

To avoid such a situation, when the circuit is switched from the currently active transmitting/receiving circuit 101a to the standby transmitting/receiving circuit 101b, the active circuit 101a must be completely shut down once to suspend the data transfer between the station equipment 101 and the subscriber equipments 105 to 107, and transmission delays of signals from the respective subscriber equipments 105 to 107 to the standby circuit 101b must be measured in order to rearrange the multiplexing positions of the burst signals. The measurement of transmission delay is carried out for each of the subscriber equipments and thus consumes considerable time before recovery, and communications during the measurement are not feasible.

SUMMARY OF THE INVENTION

An object of the present invention is to provide a transmission timing adjusting device for a transmitting/receiving apparatus equipped with active and standby transmitting/ receiving means for carrying out two-way communications via an identical communication path, which device permits a switching from the currently active system to the standby system without interrupting ongoing communications.

To achieve the above object, the present invention provides a transmission timing adjusting device for a transmitting/receiving apparatus provided with active transmitting/receiving means and standby transmitting/receiving means for carrying out two-way communications via an identical communication path. The transmission timing adjusting device comprises active-side time detecting means for detecting a first time period from a first time at which the active transmitting/receiving means transmits a first transmission signal to a second time at which the active transmitting/receiving means receives a second transmission signal transmitted from a remote station in response to the first transmission signal, standby-side time detecting means for detecting a second time period from the first time at which the active transmitting/receiving means transmits the first transmission signal to a third time at which the standby transmitting/receiving means receives the second transmission signal transmitted from the remote station in response to the first transmission signal, difference calculating means for calculating a difference between the first and second time periods, and transmission timing adjusting means for previously adjusting transmission timing of the standby transmitting/receiving means in accordance with the difference calculated by the difference calculating means.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment according to the present invention is outlined first.

Figure 1:
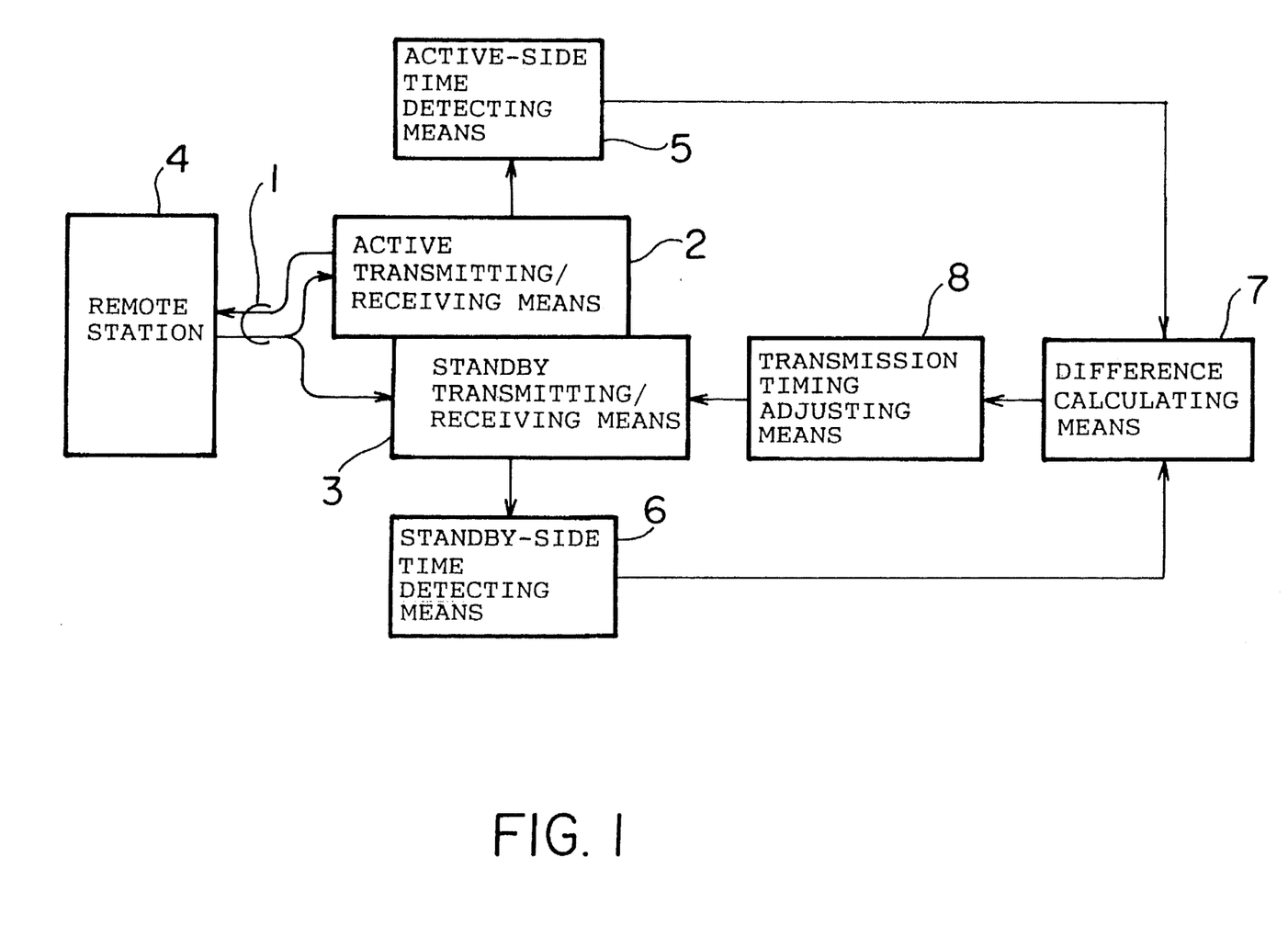
FIG. 1 is a diagram illustrating the principles of the present invention.

As shown in FIG. 1, a transmitting/receiving apparatus for carrying out two-way communications via an identical communication path 1 is provided with two transmitting/receiving means 2 and 3, transmitting/receiving means 2 for actual use and transmitting/receiving means 3 for standby reserve, as well as with a transmission timing adjusting device having the following configuration:

The transmission timing adjusting device comprises time detecting means 5 for the active system, which detects a first time period from a first time at which the active transmitting/receiving means 2 transmits a first transmission signal to a second time at which the active transmitting/receiving means 2 receives a second transmission signal transmitted from a remote station 4 in response to the first transmission signal, time detecting means 6 for the standby system, which detects a second time period from the first time at which the active transmitting/receiving means 2 transmits the first transmission signal to a third time at which the standby transmitting/receiving means 3 receives the second transmission signal transmitted from the remote station 4 in response to the first transmission signal, difference calculating means 7 for calculating the difference between the first and second time periods, and transmission timing adjusting means 8 for previously adjusting the transmission timing of the standby transmitting/receiving means 3 in accordance with the difference calculated by the difference calculating means 7.

In the transmission timing adjusting device described above, the active transmitting/receiving means 2 transmits the first transmission signal to the remote station 4, which is one of subscriber equipments. Upon receiving the first transmission signal, the remote station 4 transmits the second transmission signal to the active and standby transmitting/receiving means 2 and 3. The standby transmitting/receiving means 3 performs signal reception only, and does not transmit signals while it assumes a standby status.

The active-side time detecting means 5 detects the first time period from the first time at which the active transmitting/receiving means 2 transmits the first transmission signal to the second time at which the active transmitting/receiving means 2 receives the second transmission signal from the remote station 4. The standby-side time detecting means 6 detects the second time period from the first time to the third time at which the standby transmitting/receiving means 3 receives the second transmission signal. If the length of the transmission path from the active transmitting/receiving means 2 to the remote station 4 differs from that of the transmission path from the standby transmitting/receiving means 3 to the remote station 4, then the first and second time periods differ from each other.

Figure 2:
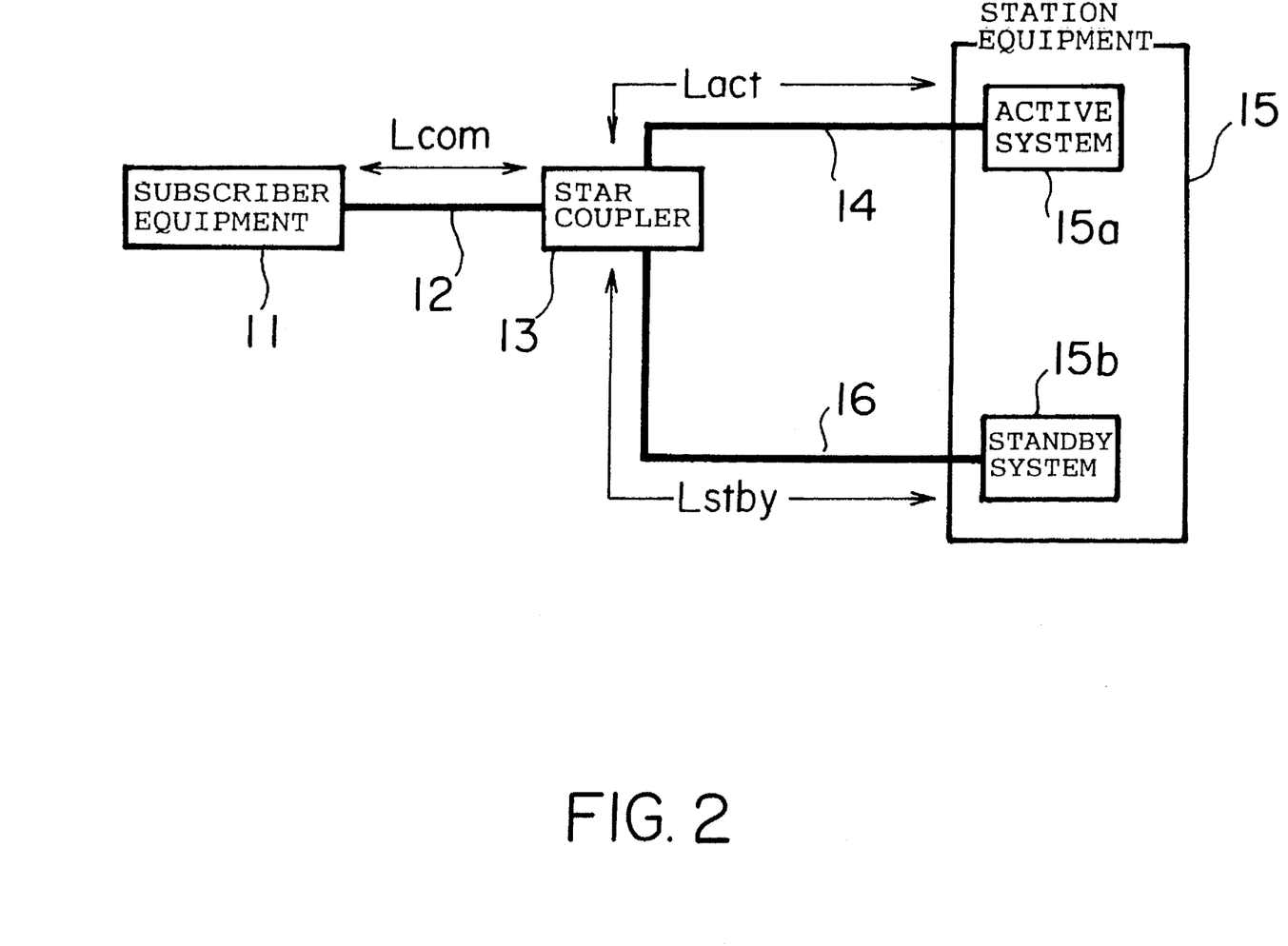
FIG. 2 is a diagram illustrating how a subscriber equipment is connected to a station equipment.

The first and second time periods will be explained with reference to FIG. 2 which illustrates how a subscriber equipment is connected to a station equipment. In the figure, a subscriber equipment 11 is connected to a star coupler 13 via an optical fiber 12. The star coupler 13 is connected to a currently active system 15a of a station equipment 15 via an optical fiber 14, and is also connected to a standby system 15b of the station equipment 15 via an optical fiber 16. Provided the lengths of the optical fibers 12, 14 and 16 are Lcom, Lact and Lstby, respectively, the aforementioned first time period is a time period nearly proportional to the distance 2×(Lact+Lcom), and the second time period is a time period nearly proportional to the distance (Lact+2× Lcom+Lstby).

Referring again to FIG. 1, the difference calculating means 7 calculates the difference between the first and second time periods. Namely, the means 7 calculates a time difference proportional to the difference (Lact−Lstby) between the distance 2×(Lact+Lcom) and the distance (Lact+2×Lcom+Lstby). Based on the difference calculated by the difference calculating means 7, the transmission timing adjusting means 8 adjusts the transmission timing of the standby transmitting/receiving means 3 in advance. That is, the transmission timing adjusting means 8 adjusts the transmission timing of the standby transmitting/receiving means 3 in such a manner that when the standby means 3 assumes the position of an active system at some later time, the time at which the remote station 4 receives signals from the standby means 3 is in exact agreement with the time at which the remote station 4 has received signals from the transmitting/receiving means 2 then active.

Thus, if the transmitting/receiving means is switched from the currently active system to the standby system, interruption of communications never occurs during the switching operation.

The embodiment of the present invention will now be described in detail.

Figure 3:
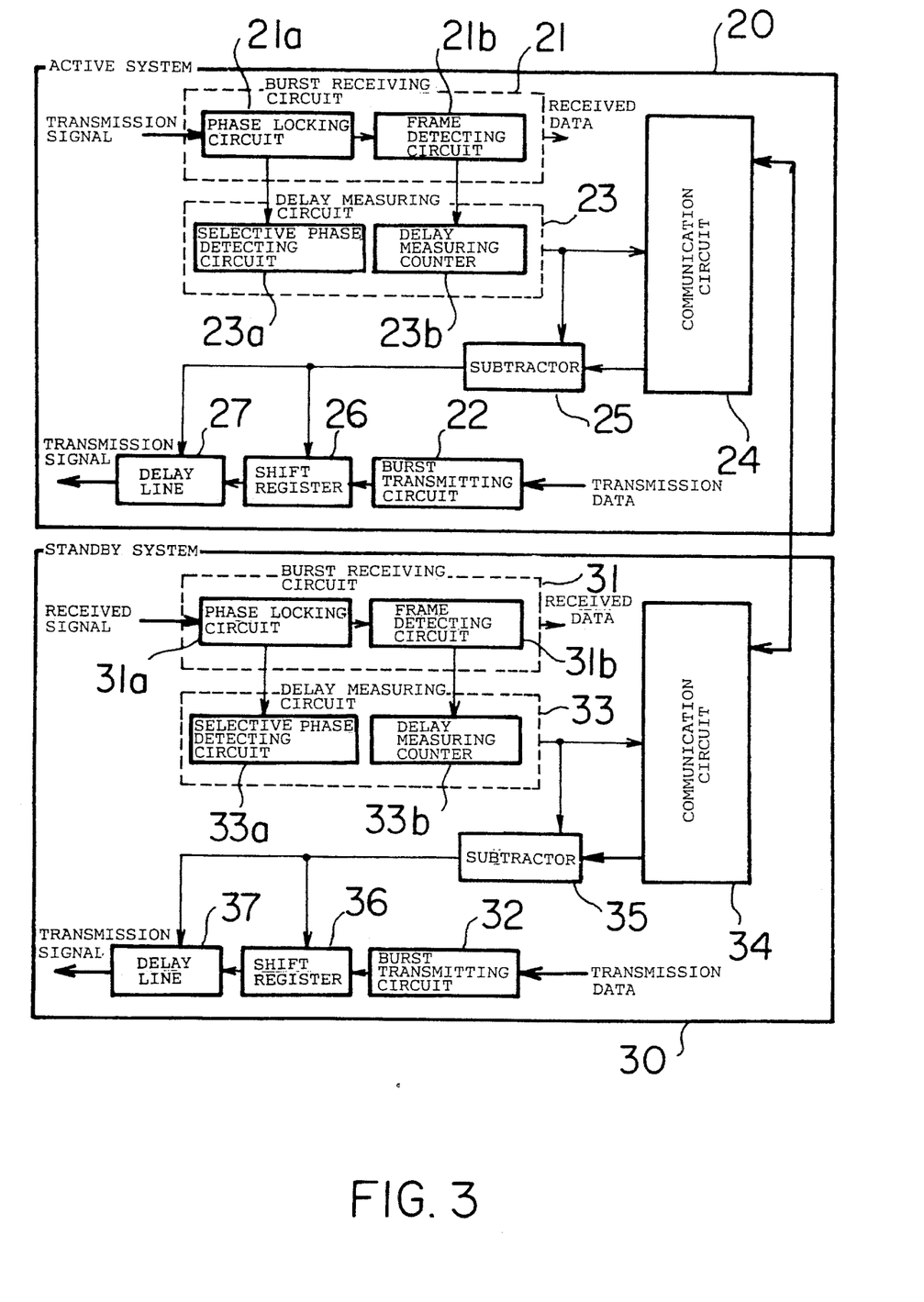
FIG. 3 is a block diagram showing the internal arrangement of the station equipment according to the present invention.

FIG. 3 is a block diagram illustrating an internal arrangement of a station equipment according to the present invention. Like the station equipment shown in FIG. 8, the station equipment is connected to each of subscriber equipments (not shown) via an optical fiber for carrying out optical communications according to TCM-TDMA procedure. The station equipment is composed of a transmitting/receiving apparatus 20 as a currently active system and a transmitting/receiving apparatus 30 as a standby system, the apparatuses 20 and 30 having the same arrangement. These apparatuses 20 and 30 are interrelated such that while one operates as an active system, the other assumes a standby status. The following description is based on the assumption that the apparatus 20 functions as an active system; therefore, the standby transmitting/receiving apparatus 30 always performs signal reception only and does not transmit signals.

The active transmitting/receiving apparatus 20 basically comprises a burst receiving circuit 21 for receiving signals and extracting and outputting received data, and a burst transmitting circuit 22 for converting transmission data to signals for transmission and outputting the converted signals for transmission. The burst receiving circuit 21 includes a phase locking circuit 21a for following the phase of the received signal supplied thereto, and a frame detecting circuit 21b for detecting a frame pattern in the received signal. The internal arrangement of the frame detecting circuit 21b will be described later with reference to FIGS. 4(A) and 4(B). The burst transmitting circuit 22 operates while the transmitting/receiving apparatus 20, in which the circuit 22 is arranged, functions as an active system, and is inoperative while the apparatus 20 is a standby system.

The burst receiving circuit 21 is connected to a delay measuring circuit 23 for measuring a delay time of signal transmission on a transmission path. The delay measuring circuit 23 is composed of a selective phase detecting circuit 23a connected to the phase locking circuit 21a of the burst receiving circuit 21, and a delay measuring counter 23b connected to the frame detecting circuit 21b. The delay measuring counter 23b measures the delay time of signal transmission on a transmission path by counting reference clock pulses, and outputs the measured delay time. The selective phase detecting circuit 23a precisely detects the delay time of signal transmission in the order of one cycle or less of the reference clock, and outputs the detected delay. The internal arrangement of the selective phase detecting circuit 23a will be described in detail later with reference to FIG. 6, and the internal arrangement of the delay measuring counter 23b will be described in detail later with reference to FIGS. 4(A) and 4(B).

The outputs of the selective phase detecting circuit 23a and delay measuring counter 23b of the delay measuring circuit 23 are supplied to a communication circuit 24 and a subtractor 25. The communication circuit 24 is connected to a communication circuit 34 of the standby transmitting/receiving apparatus 30, to supply the two items of data about the delay time of signal transmission, supplied from the delay measuring circuit 23, to the communication circuit 34, and to receive two items of data about a delay time of signal transmission of the standby side from the communication circuit 34 to be supplied to the subtractor 25. Among the two items of data representing the delay time of signal transmission of the active side, supplied from the delay measuring circuit 23, and the two items of data representing the delay time of signal transmission of the standby side, supplied from the communication circuit 34, the subtractor 25 obtains the differences between the corresponding pairs of the four data items. The subtractor 25 supplies a shift register 26 with the difference based on the counts of the reference clock pulses, and supplies a delay line 27 with the difference based on the precise measurement of the delay times in the order of one cycle or less of the reference clock. The subtractor 25 is inoperative while the transmitting/receiving apparatus 20, in which the subtractor 25 is arranged, functions as an active system, and operates while the apparatus 20 assumes a standby status. Accordingly, the shift register 26 and the delay line 27 are inoperative while the transmitting/receiving apparatus 20, in which they are arranged, functions as an active system, and operate while the apparatus 20 assumes a standby status.

The shift register 26 and the delay line 27 are connected to the output side of the burst transmitting circuit 22. The shift register 26 is a variable shift register, in which registers corresponding in number to the difference obtained based on the counts of the reference clock pulses and supplied from the subtractor 25 operate so as to adjust the phase of a serial input signal on a bit-by-bit basis. The delay line 27 provides a delay corresponding to the difference which is obtained based on the precise measurement of the delay times in the order of one cycle or less of the reference clock and supplied from the subtractor 25. Specifically, in the case where the optical fiber connecting the transmitting/receiving apparatus 20 to the star coupler is longer than the optical fiber connecting the transmitting/receiving apparatus 30 to the star coupler and thus the reception timing of the apparatus 20 is later than that of the apparatus 30, for example, the shift register 26 of the transmitting/receiving apparatus 20 advances the transmission timing thereof when the apparatus 20 becomes a standby system. The delay line 27 finely adjusts the transmission timing within a range corresponding to one cycle or less of the reference clock.

The arrangement of the standby transmitting/receiving apparatus 30 is exactly the same as that of the active transmitting/receiving apparatus 20; therefore, description of the standby apparatus 30 is omitted.

The internal arrangements of frame detecting circuits 21b and 31b, selective phase detecting circuits 23a and 33a, and delay measuring counters 23b and 33b will now be explained in detail.

Figure 4:
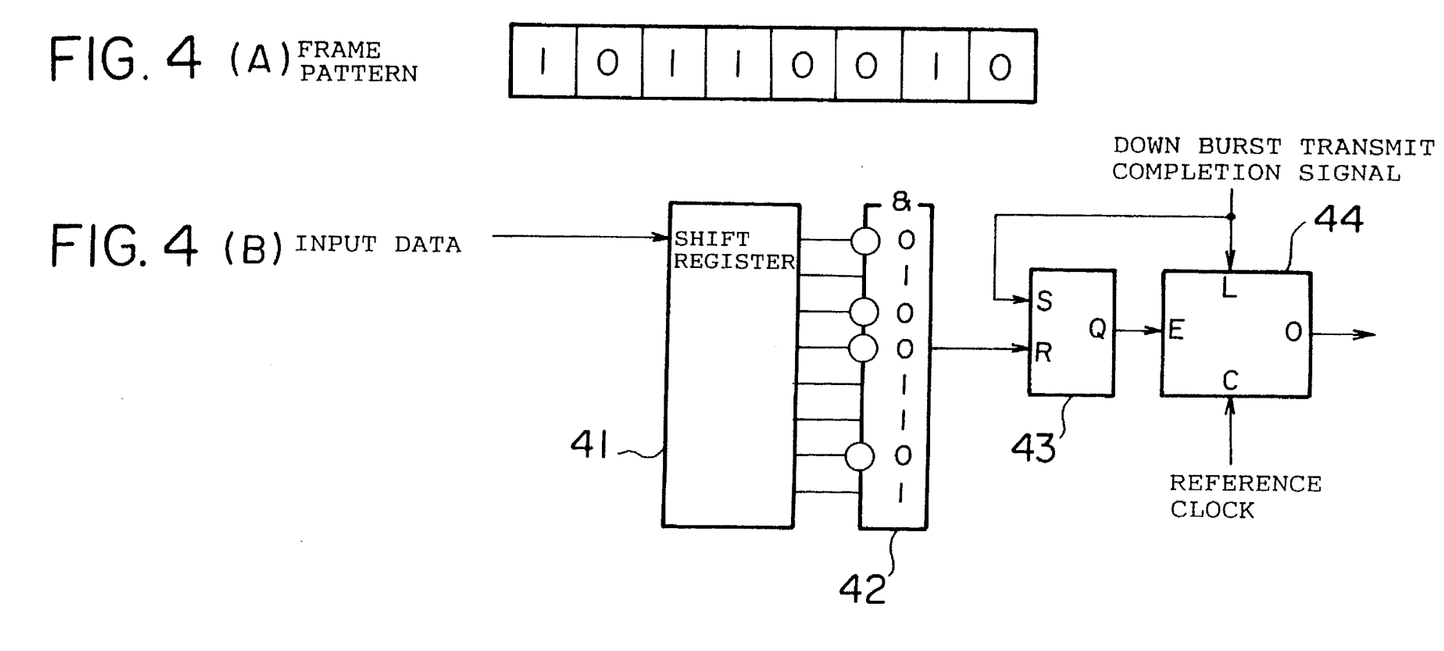
FIG. 4(A) is a diagram showing a frame pattern.
FIG. 4(B) is a diagram showing the internal arrangement of a frame detecting circuit and delay measuring counter in detail.

FIGS. 4(A) and 4(B) respectively illustrate the frame pattern and the internal arrangement of frame detecting circuit and delay measuring counter in detail.

In the optical communication system to which the present invention is applied, each subscriber equipment transmits a delay measurement burst signal to the station equipment upon receiving a down signal from the station equipment. The delay measurement burst signal comprises a preamble consisting of 8-bit alternating signal, and a frame pattern "10110010" shown in FIG. 4(A).

The frame detecting circuit is composed of a shift register 41 and an AND circuit 42, and the delay measuring counter is composed of an SR latch 43 and a counter 44. The shift register 41 is supplied serially with the data input to the station equipment, shifts the data therein bit by bit, and provides an 8-bit parallel output to the AND circuit 42. An inverter is arranged at each of the second, fifth, sixth and eighth input terminals of the AND circuit 42. Accordingly, when the frame pattern "10110010" is input to the shift register 41, the AND circuit 42 is supplied with "11111111". The AND circuit 42 outputs a position detection pulse "1" to the R terminal of the SR latch 43 only when it is supplied with "11111111".

The (S) terminal of the SR latch 43 and the load (L) terminal of the counter 44 are each supplied with a down burst transmit completion signal. The down burst transmit completion signal is generated when the active transmitting/receiving apparatus 20 completes the transmission of a down burst signal to a specific subscriber equipment. The reference clock pulses are supplied to the clock (C) terminal of the counter 44, the enable (E) terminal of which is connected to the output (Q) terminal of the SR latch 43. Accordingly, the SR latch 43 outputs from the (Q) terminal thereof an enable signal which turns to high-level during a period from the time it is supplied with the down burst transmit completion signal to the time it is supplied with the position detection pulse "1" from the AND circuit 42. The counter 44 counts the input reference clock pulses only while it is supplied with the enable signal, and outputs the count value through the output (0) terminal.

Figure 5:
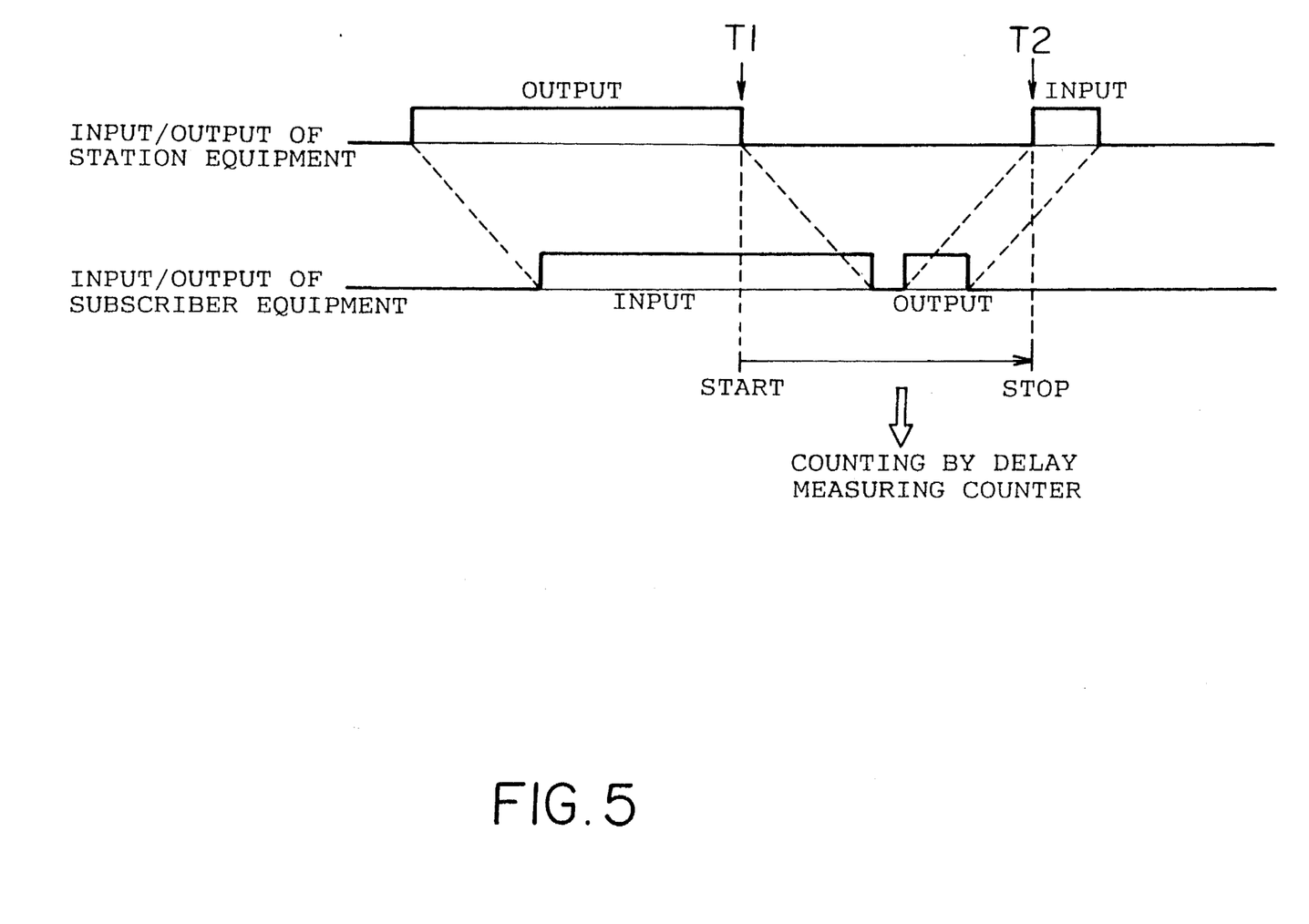
FIG. 5 is a timing chart illustrating the operation of the frame detecting circuit and delay measuring counter.

The operation of the frame detecting circuit and delay measuring counter constructed as above is explained with reference to FIG. 5 which illustrates the operation timings of these elements.

At a time T1 at which the active transmitting/receiving apparatus 20 of the station equipment completes the transmission of a down burst signal to the specific subscriber equipment, the delay measuring counters 23b and 33b of the active and standby systems individually start counting up the reference clock pulses input thereto from zero. The specific subscriber equipment receives the down burst signal with some time delay, and upon lapse of a predetermined time, transmits a delay measurement burst signal to the active and standby transmitting/receiving apparatuses 20 and 30 of the station equipment. The active and standby transmitting/receiving apparatuses 20 and 30 of the station equipment each receive the delay measurement burst signal with some time delay, whereupon the frame detecting circuits 21b and 31b of the active and standby transmitting/receiving apparatuses 20 and 30 individually detect the frame pattern and then stop the counting operation of the delay measuring counters 23b and 33b at a detection time T2 (in general, the time T2 of the active system differs from that of the standby system). The count values of the delay measuring counters 23b and 33b respectively represent time periods proportional to the distances 2×(Lact+Lcom) and (Lact+2×Lcom+Lstby), shown in FIG. 2, in terms of a number of reference clock pulses. These values are supplied to the subtractor 35 of the standby system, which then calculates the difference (Lact−Lstby). Based on the difference thus obtained, the shift register 36 of the standby system adjusts the transmission timing of the standby transmitting/receiving apparatus 30.

Figure 6:
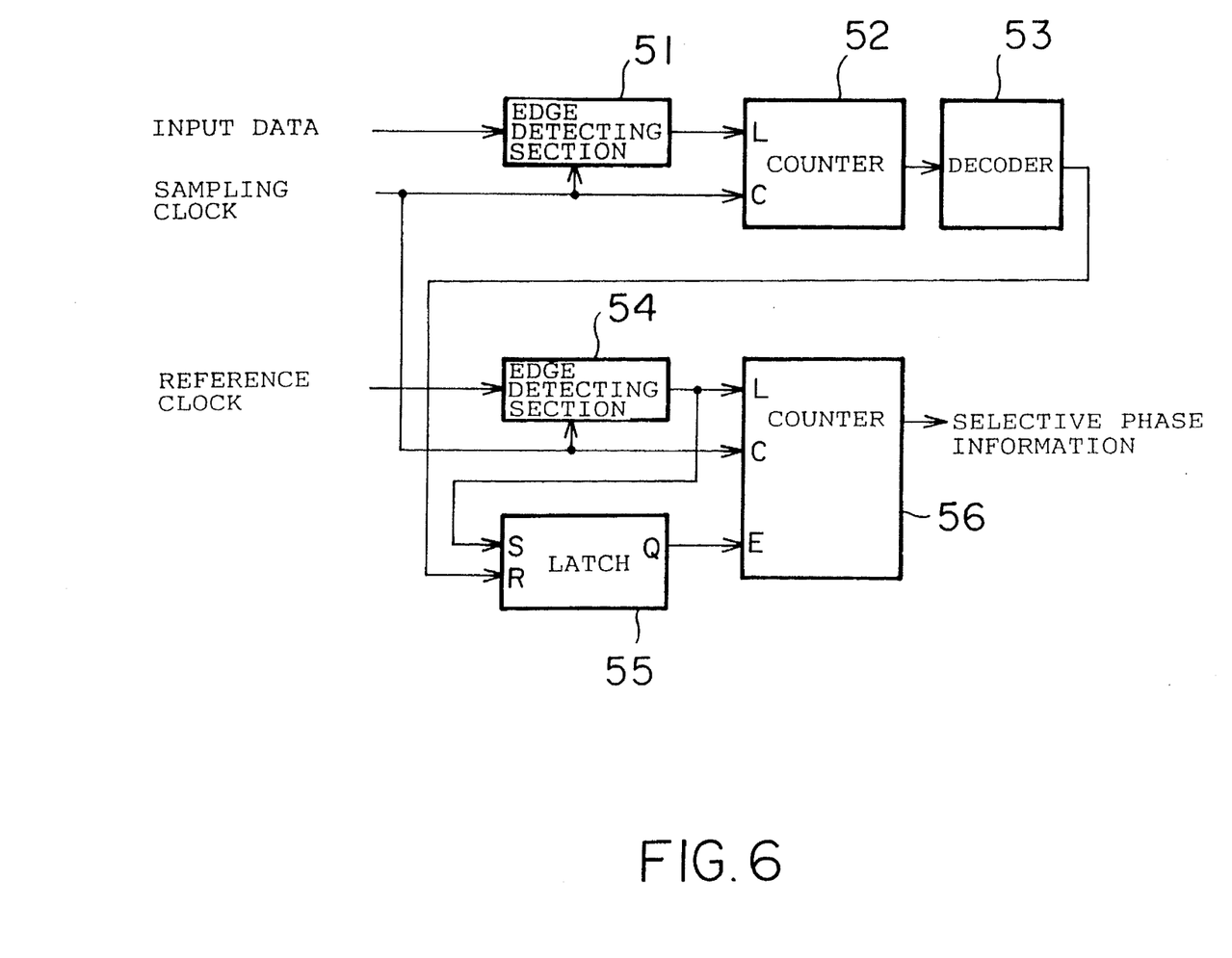
FIG. 6 is a block diagram showing the internal arrangement of a phase detecting circuit.

FIG. 6 is a block diagram illustrating the internal arrangement of the selective phase detecting circuit. The aforementioned delay measuring counter is incapable of detecting the delay time with a precision equivalent to one cycle or less of the reference clock, and therefore, the selective phase detecting circuit is designed to detect the delay time with such high precision.

The selective phase detecting circuit comprises an edge detecting section 51, a counter 52, a decoder 53, an edge detecting section 54, an SR latch 55, and a counter 56. The edge detecting section 51 is supplied with the preamble which is an alternating signal contained in the delay measurement burst signal input to the station equipment, and the other edge detecting section 54 is supplied with the reference clock pulses. The clock (C) terminal of each of the counters 52 and 56 is supplied with sampling clock pulses. The sampling clock has a pulse generation cycle shorter than that of the reference clock; for example, the interval between successive sampling clock pulses is ⅙ the interval between successive reference clock pulses.

Figure 7:
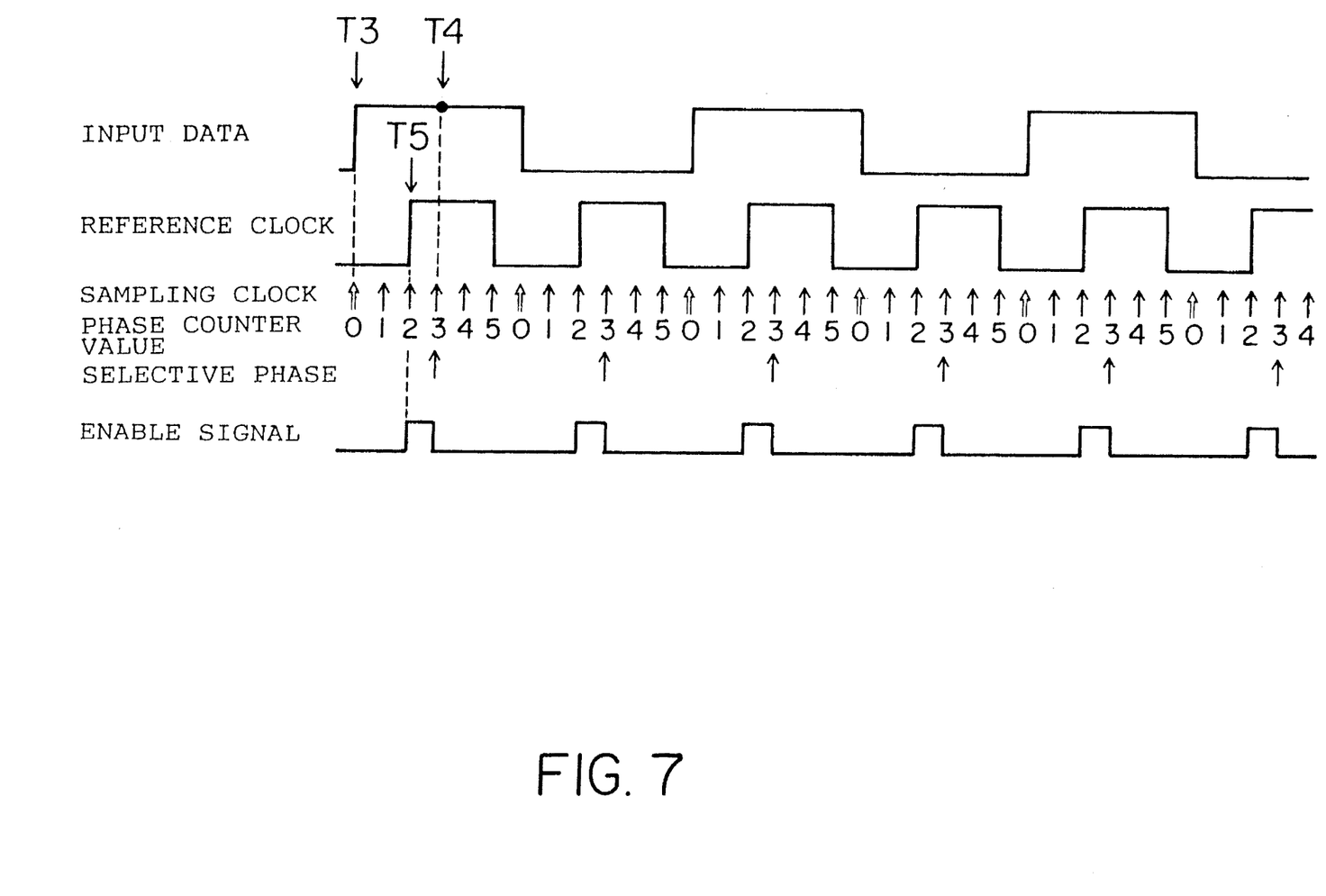
FIG. 7 is a timing chart illustrating signals at various parts in a selective phase detecting circuit.

The construction and operation of the selective phase detecting circuit will be described with reference to FIG. 7 which illustrates the signal generation times at various parts in the circuit. The edge detecting section 51 detects the leading and trailing edges of the preamble (alternating signal), and provides an output to the load (L) terminal of the counter 52. Accordingly, the counter 52 counts the sampling clock pulses (see "PHASE COUNTER VALUE" in FIG. 7) during a period from a leading edge (timing T3 in FIG. 7) of the preamble (alternating signal) to the succeeding trailing edge of the same signal, or during a period from a trailing edge of the preamble to the succeeding leading edge of the same signal, and outputs the count value to the decoder 53. The value "3", for example, is previously set in the decoder 53, and each time the value "3" is supplied from the counter 52 (timing T4 in FIG. 7), the decoder 53 outputs a selective phase clock signal to the SR latch 55. The value "3" preset in the decoder 53 is selected on the basis of the cycle of the alternating preamble signal and the generation cycles of the reference clock pulses and sampling clock pulses, and is set to a value corresponding to an intermediate phase in the cycle of the alternating preamble signal.

The edge detecting section 54 detects the leading edge of the reference clock pulse (time T5 in FIG. 7), and provides an output to the load (L) terminal of the counter 56 and to the S terminal of the SR latch 55. The output (Q) terminal of the SR latch 55 is connected to the enable (E) terminal of the counter 56. Thus, the SR latch 55 outputs from the Q terminal thereof an enable signal which turns to high-level during a period from the detection of the leading edge of a reference clock pulse (time T5 in FIG. 7) to the output of a selective phase clock signal from the decoder 53 (time T4 in FIG. 7), to the enable terminal of the counter 56. The counter 56 counts the input sampling clock pulses only while it is supplied with the enable signal, and outputs the count value from the output (O) terminal thereof. Namely, the output value of the counter 56 represents the amount of lag of a selective phase (time T4 in FIG. 7) with respect to the detection time of the leading edge of the corresponding reference clock pulse (time T5 in FIG. 7), in terms of a number of sampling clock pulses.

The selective phase detecting circuits 23a and 33a arranged respectively in the active and standby systems of the station equipment each have the above-described arrangement so as to detect the selective phase, which is an identical phase position in the preamble, as an amount of lag with respect to the reference clock. The difference between the detected values is obtained at the subtractor 35 of the standby system. Accordingly, a small difference equivalent to one cycle or less of the reference clock between the delay time of the active system and that of the standby system can be detected, and based on the difference thus obtained, the delay line 37 of the standby system adjusts the transmission timing of the standby transmitting/receiving apparatus 30.

The delay measuring circuits 23 and 33 in FIG. 3 instantly output two items of detected data; instead, they may be designed to average a plurality of data items obtained through a plurality of detections and output the average data.

The selective phase detecting circuits 23a and 33a and the delay lines 27 and 37, shown in FIG. 3, are necessary for the fine adjustment of the transmission timing of the standby transmitting/receiving apparatus, but this fine adjustment is not essential. The apparatus of the present invention can operate satisfactorily without the selective phase detecting circuits 23a and 33a and the delay lines 27 and 37.

As described above, according to the present invention, the active and standby transmitting/receiving apparatuses of the station equipment measure delay times of the respective transmission paths by means of the signal transmitted from a remote station. The difference between the delay times is calculated, and the transmission timing of the standby transmitting/receiving apparatus is adjusted beforehand in accordance with the calculated difference. Accordingly, when the standby transmitting/receiving apparatus becomes active, the remote station can receive signals at the same timing as before the system switching. It is, therefore, unnecessary to carry out measurement of delays newly caused by the system switching, rearrangement of the multiplexing positions of burst signals, and like operations, and interruption of communications does not occur.

Further, since the phase difference is detected by means of sampling clock pulses generated at shorter intervals than the reference clock pulses, the transmission timing can be adjusted with higher accuracy.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A transmission timing adjusting device for a transmitting/receiving apparatus provided with active transmitting/receiving means and a standby transmitting/receiving means for carrying out two-way communications via an identical communication path, said device comprising:

active-side time detecting means for detecting a first time period from a first difference between a first time, occurring when the active transmitting/receiving means transmits a first transmission signal and a second time occurring when the active transmitting/receiving means receives a second transmission signal transmitted from a remote station in response to the first transmission signal;

standby-side time detecting means for detecting a second time period from a second difference between the first time occurring when the active transmitting/receiving means transmits the first transmission signal and a third time occurring when the standby transmitting/receiving means receives the second transmission signal transmitted from the remote station in response to the first transmission signal;

difference calculating means for calculating a difference between the first and second time periods; and transmission timing adjusting means for adjusting the transmission timing of the standby transmitting/receiving means in accordance with the difference calculated by said difference calculating means.

2. The transmission timing adjusting device according to claim 1, further comprising reference clock pulse generating means for generating reference clock pulses, wherein said active- and standby-side time detecting means detect the first and second time periods, respectively, by counting the reference clock pulses generated by said reference clock pulse generating means.

3. The transmission timing adjusting device according to claim 2, wherein said transmission timing adjusting means comprises a variable shift register.

4. The transmission timing adjusting device according to claim 2, which further comprises, sampling clock pulse generating means for generating sampling clock pulses at intervals shorter than the reference clock pulses, active-side time lag detecting means for detecting a first time lag between the second time and the reference clock pulses in terms of a number of the sampling clock pulses, standby-side time lag detecting means for detecting a second time lag between the third time and the reference clock pulses in terms of a number of the sampling clock pulses, and fine adjustment means for adjusting the transmission timing of the standby transmitting/receiving means within a range equivalent to one interval or shorter of the reference clock pulses, based on the first and second time lags detected by said active- and standby-side time lag detecting means.

5. The transmission timing adjusting device according to claim 4, wherein said fine adjustment means comprises a delay line.

6. The transmission timing adjusting device according to claim 1, wherein said communication path comprises an optical communication line.

7. The transmission timing adjusting device according to claim 1, wherein said active and standby transmitting/receiving means each carry out communications according to a TCM-TDMA procedure.

8. The transmission timing adjusting device according to claim 1, wherein said second transmission signal comprises a delay measurement burst signal including a predetermined frame pattern, said second time being coincident with a point of time at which said active-side time detecting means detects the predetermined frame pattern, and said third time being coincident with the point of time at which said standby-side time detecting means detects the predetermined frame pattern.

9. A transmission timing adjusting device for a transmitting/receiving apparatus provided with an active transmitter/receiver and a standby transmitter/receiver for carrying out two-way communications via an identical communication path, said device comprising:

an active-side time detector for detecting a first time period from a first difference between a first time, occurring when the active transmitter/receiver transmits a first transmission signal and a second time occurring when the active transmitter/receiver receives a second transmission signal transmitted from a remote station in response to the first transmission signal;

a standby-side time detector for detecting a second time period from a second difference between the first time occurring when the active transmitter/receiver transmits the first transmission signal and a third time occurring when the standby transmitter/receiver receives the second transmission signal transmitted from the remote station in response to the first transmission signal;

a difference calculator for calculating a difference between the first and second time periods; and a transmission timing adjustor for adjusting the transmission timing of the standby transmitter/receiver in accordance with the difference calculated by said difference calculator.

10. The transmission timing adjusting device according to claim 9, further comprising a reference clock pulse generator for generating reference clock pulses, wherein said active- and standby-side time detectors detect the first and second time periods, respectively, by counting the reference clock pulses generated by said reference clock pulse generator.

11. The transmission timing adjusting device according to claim 10, wherein said transmission timing adjusting means comprises a variable shift register;

said active transmitter/receiver includes a first burst receiving circuit, a first delay measuring circuit, a first subtractor, a first communication circuit, a first delay line, a first shift register, and a first burst transmitting circuit; and, said standby transmitter/receiver includes a second burst receiving circuit, a second delay measuring circuit, a second subtractor, a second communication circuit, a second delay line, a second shift register, and a second burst transmitting circuit.

12. The transmission timing adjusting device according to claim 10 further comprising:

a sampling clock pulse generator for generating sampling clock pulses at intervals shorter than the reference clock pulses, an active-side time lag detector for detecting a first time lag between the second time and the reference clock pulses in terms of a number of the sampling clock pulses, a standby-side time lag detector for detecting a second time lag between the third time and the reference clock pulses in terms of a number of the sampling clock pulses, and a fine adjuster for adjusting the transmission timing of the standby transmitter/receiver within a range equivalent to one interval or shorter of the reference clock pulses, based on the first and second time lags detected by said active- and standby-side time lag detector.

13. The transmission timing adjusting device according to claim 12, wherein said fine adjuster comprises a delay line.

14. The transmission timing adjusting device according to claim 9, wherein said communication path comprises an optical communication line.

15. The transmission timing adjusting device according to claim 9, wherein said active and standby transmitter/receiver each carry out communications according to a TCM-TDMA procedure.

16. The transmission timing adjusting device according to claim 9, wherein said second transmission signal comprises a delay measurement burst signal including a predetermined frame pattern, said second time being coincident with a point of time at which said active-side time detector detects the predetermined frame pattern, and said third time being coincident with the point of time at which said standby-side time detector detects the predetermined frame pattern.

* * * * *